Dec. 9, 1958   M. SIGMAN   2,863,696
GUIDE GATES FOR CATTLE TRUCKS
Filed Jan. 2, 1957
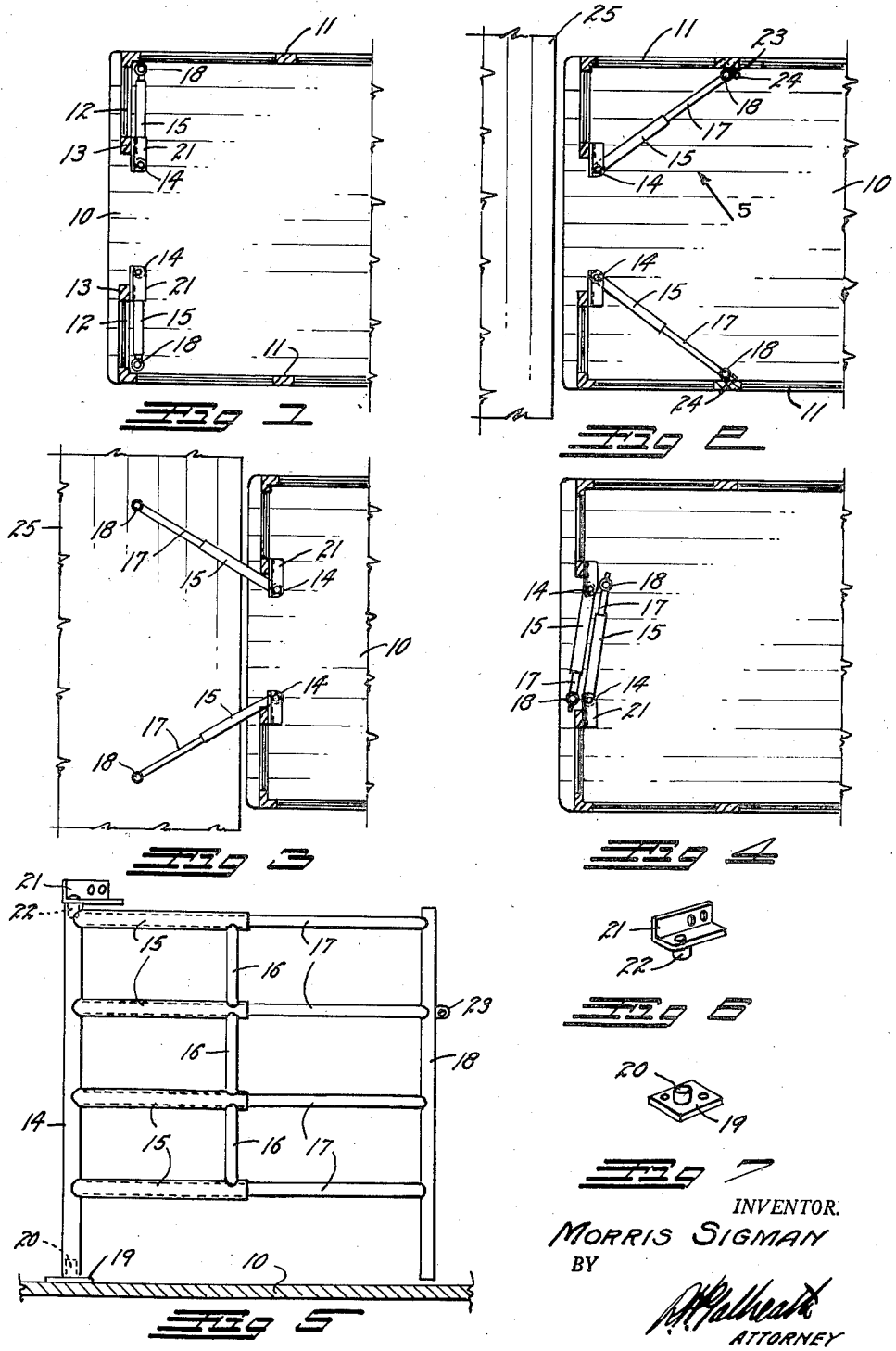
INVENTOR.
MORRIS SIGMAN
BY
ATTORNEY

United States Patent Office 2,863,696
Patented Dec. 9, 1958

2,863,696

GUIDE GATES FOR CATTLE TRUCKS

Morris Sigman, Denver, Colo.

Application January 2, 1957, Serial No. 632,211

2 Claims. (Cl. 296—51)

One of the principal losses in the meat packing industry results from hip bruises on the cattle and it has been found that the majority of these hip bruises are occasioned in loading and unloading the cattle from cattle trucks. There is a tendency during both the unloading and loading operations for two animals to attempt to crowd through the truck gate simultaneously, thus, forcing the hips of the foremost animals against the gate jamb to cause hip bruises which must be later cut from the meat, resulting in relatively heavy packing losses.

The invention relates to such cattle trucks and more particularly to a gate for such trucks which will prevent two animals from attempting to exit or enter simultaneously, and which will gently guide the animals through the opening so as to reduce the possibility of bruises to a minimum.

Another object of the invention is to so construct the improved gate that it can be quickly and economically installed in present trucks and so that it will occupy but a minimum of space in the truck when not in use.

A further object is to so construct the gate that it can be used for both loading and unloading purposes and also as a tail gate for the cattle truck.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a diagrammatic, plan view of the rear portion of the floor of a conventional cattle truck with the improved gate installed therein, illustrating the gate in the out-of-use position;

Fig. 2 is a similar view, illustrating the gate in position for discharging cattle from the truck;

Fig. 3 is a similar view, illustrating the gate in position for loading cattle into the truck;

Fig. 4 is a similar view, illustrating the improved gate used as a closure or tail gate for the truck;

Fig. 5 is an enlarged face view of the improved gate in the extended position, looking in the direction of the arrow 5, Fig. 2;

Fig. 6 is a detail perspective view, illustrating an upper hinge member for the improved gate; and Fig. 7 is a similar perspective view, illustrating a lower hinge member for the improved gate.

In the drawing, a loading dock has been indicated at 25 and the floor of a conventional cattle truck has been indicated at 10, with its side walls at 11, and rear walls at 12. Such a truck is usually provided with a rear gate opening having vertical body jambs 13 at each side thereof.

The improved gate comprises two gate members constructed as illustrated in Fig. 5, each comprising a tubular, vertical hinge post 14 from which a plurality, preferably four, of horizontal frame tubes 15 project in vertically aligned and vertically spaced arrangement. The frame tubes 15 are welded or otherwise secured to the hinge post 14 and are maintained in rigid spaced relation at their free extremities by means of vertical spacer tubes 16.

A slide tube 17 is positioned within each frame tube 15 in telescopic relation therewith. The slide tubes are welded or otherwise secured to a vertical gate tube 18. The elements 15 through 18 are preferably, but not necessarily, formed from aluminum tubing.

Two of the gate structures as above described are installed in each cattle truck securing a hinge plate 19 to the truck floor 10 at each side of the gate opening. The hinge plates are formed with upstanding lugs 20, such as shown in Fig. 7, over which the lower extremities of the hinge posts 14 are rotatably positioned. The upper extremities of the hinge posts 14 are hingedly mounted in any desired manner such as by means of angle clips 21 secured to the gate jambs 13. The clips 21 are also provided with downwardly extending lugs 22, such as shown in Fig. 6, which enter the upper extremities of the hinge posts 14 to provide pivots therefor.

The two hinge posts 14 are installed so as to be positioned apart slightly more than the maximum expected hip width of a single animal, so that it will be impossible for two animals to attempt to crowd between the two hinge posts. A spacing of thirty inches has been found to be satisfactory.

When not in use the two gate structures may be folded against the inside of the rear walls 12, as shown in Fig. 1. When desired for use in unloading cattle from the truck, the two gate structures are expanded by sliding the tubes 17 from the tubes 15 and positioning the gate tubes 18 against the side walls 11 of the truck, as shown in Fig. 2, to form a gradually inclined funnel for directing animals through the discharge opening and onto the dock 25. When in use for loading cattle into the truck, the two gate structures are swung outwardly and expanded on the loading dock 25, as shown in Fig. 3, to provide inclined guide fences for guiding the animals into the truck opening.

If desired as an end gate, the two gate structures are collapsed and folded against each other and secured in any desired manner, as shown in Fig. 4, to block the rear opening of the truck.

It has been found desirable to place an attachment ear 23 on each gate tube 18 which can be secured to the side walls of the truck by passing a suitable pin 24 therethrough or in any other desired manner.

The gate structures are sufficiently high to extend above the hips of the largest expected animals so that there will be no possibility of bruising the animals by the upper hinge clips or other structures. The tubes from which the members are formed are smooth and unobstructed to prevent injury to the animals.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. A combined cattle guide and end gate for a truck body of the type having side walls and a rear wall provided with a restricted rear gate opening outlined by two vertical jamb members spaced apart less than the width of said body, comprising: a vertical, rotatable hinge post positioned within and at each side of said gate opening, said hinge posts being spaced apart a distance less than the width of said opening; and a longitudinally expansible gate structure secured to and extending from each of said hinge posts, each of said gate structures being sufficiently longitudinally contractible to be swung through said rear gate opening and expanded to form flaring guide structures either interiorly or exteriorly of said opening for guiding cattle either into or out of said opening, and being sufficiently expansible so that they may overlap said hinge posts to form a closure for said opening when desired.

2. A combined cattle guide and end gate for a truck body as described in claim 1 in which the gate structures are sufficiently contractible so that they may be swung into said truck body, thence outwardly and rearwardly against the inside faces of the rear wall of said truck body into a plane parallel with said rear wall.

References Cited in the file of this patent

UNITED STATES PATENTS

| | | |
|---|---|---|
| 1,511,728 | Howland | Oct. 14, 1924 |
| 1,573,060 | Harrison | Feb. 16, 1926 |
| 2,374,697 | Palisano | May 1, 1945 |
| 2,563,960 | Reymann | Aug. 14, 1951 |
| 2,701,927 | Dyer | Feb. 15, 1955 |